Figure 2:
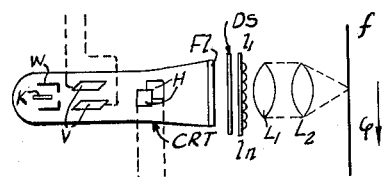

July 12, 1966   G. VALENSI   3,260,797
OPTICAL COLLIMATOR
Filed Feb. 5, 1963   2 Sheets-Sheet 1
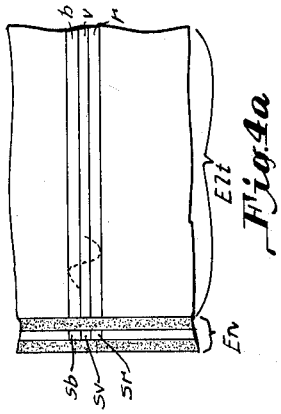
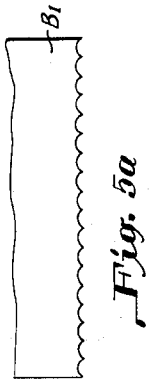
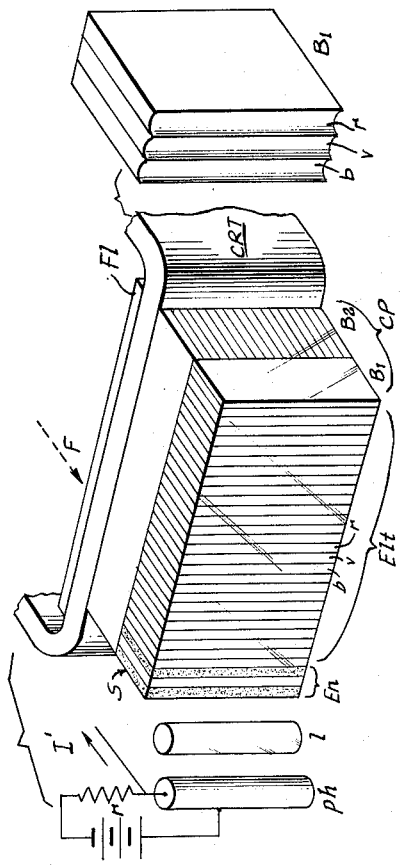
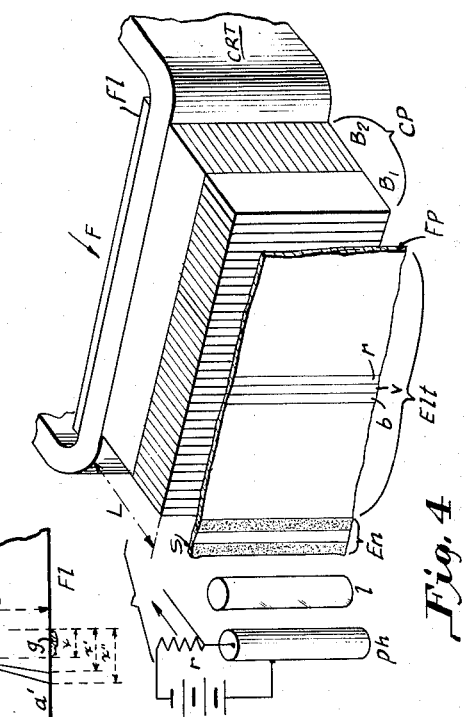
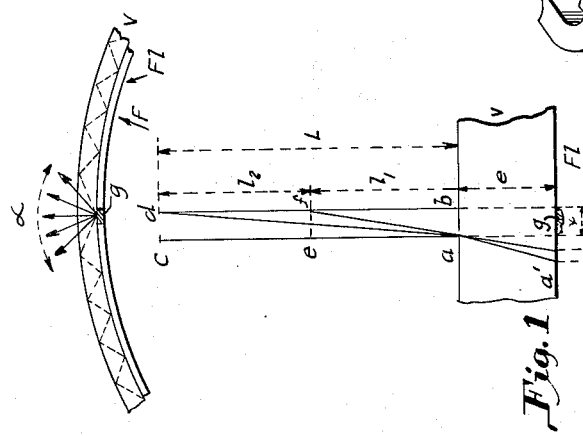
INVENTOR
Georges Valensi
BY  Roland Plottel
ATTORNEY July 12, 1966 G. VALENSI 3,260,797
OPTICAL COLLIMATOR
Filed Feb. 5, 1963 2 Sheets-Sheet 2

INVENTOR
Georges Valensi

BY Roland Plottel

ATTORNEY

United States Patent Office 3,260,797
Patented July 12, 1966

3,260,797
OPTICAL COLLIMATOR
Georges Valensi, 3 Rue des Chaudronniers,
Geneva, Switzerland
Filed Feb. 5, 1963, Ser. No. 256,278
Claims priority, application France, Feb. 28, 1962,
889,517; Apr. 3, 1962, 893,090; Apr. 17, 1962,
894,747; June 27, 1962, 902,167
11 Claims. (Cl. 178—5.4)

This invention concerns a device for collimating luminous rays in an accurately predetermined direction. As applied to a projector of light, in case of optical telegraphy, this device is located in front of a parabolic mirror at the focus of which is the source of light; in other applications, such as television reception, or data recording, or data displaying, this device is located against the wall of a cathode ray tube bearing the fluorescent screen, in order to correct the detrimental effect of the optical parallax due to the thickness of said wall which must resist to the great air pressure acting upon any vessel in which a high vacuum has been created; this parallaz correction improves, for the observer, the definition and the contrast of the luminous display produced by the electrons impinging upon said fluorescent screen.

FIGURE 1 (at the top) illustrates the production of said optical parallax; V is the cathode ray tube wall, g an elemental area of the fluorescent screen Fl, and F the electron pencil; when the electrons strike this elemental area g, a cone of light (having the angle α) gets out of tube V, the rest of the fluorescent light escaping through both ends of the wall of said tube after a plurality of total reflections shown as dotted lines on FIGURE 1.

At the bottom of FIGURE 1 is shown an elemental area g of the fluorescent screen Fl occupying a width $x$ equal to the width of a transparent fiber $(a, b, c, d)$ perpendicular to the upper wall of tube V having a thickness $e$, the length L of said fiber being shown at a reduced scale, compared to the width $x$, for making the drawing clearer. The lateral surface of said fiber must be so coated that it acts as a "light guide" for the useful fluorescent light emitted by g, but "refuses" the light coming from parts more remote than point $a'$, middle of the neighboring elemental area; the following orders of magnitude are appropriate:

$$e = 5 \text{ millimeters}$$

$$l_1 = l_2 = \frac{L}{2} = 2e$$

$$x'' = \frac{3x}{2}, \; x' = \frac{5x}{4}$$

and $$x'' - x' = \frac{x}{4}$$

Therefore only one fourth of the light emitted by a neighboring elemental area can interfere with the useful light, if the lower part $(a, e, f, b)$ of the external surface of the fiber is coated with a light-absorbing material, whereas the upper part $(e, c, f, d)$ of said surface is coated with a light-reflecting material.

In Baird patent of 1927, the use of glass-fibers for light-guiding has been proposed, a bundle of fibers of very small diameter being placed outside the cathode ray tube against the curved end wall of said tube. Fiber optics of this type are now made under this principle, but they are very expensive.

The object of the present invention is a much cheaper optical parallax corrector for use when the dissection of the image produced by the fluorescent screen of the cathode ray tube requires to consider elemental areas (g, on FIGURE 1) having a width of the order of some tenths of a millimeter; in this case, as it is not necessary to use fibers of a diameter of a few microns only, the difficulty of aligning properly numerous fibers in a bundle is avoided by the use of the devices described hereafter.

The principle on which the invention is based is as follows: two plates, acting as light guides, and put in orthogonal directions one on top of the other, are equivalent to a fiber acting as a light-guide, having a cross-section the dimensions of which are the thicknesses $x$, of said plates, and having a length L equal to the sum of the lengths of said plates.

Figure 2A:
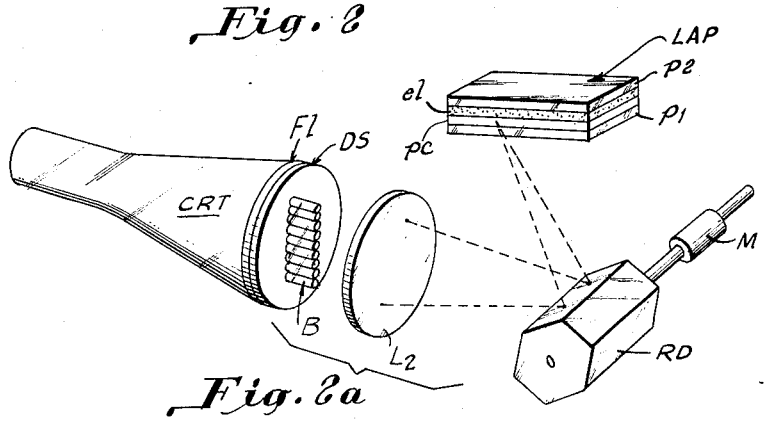
Figure 3:
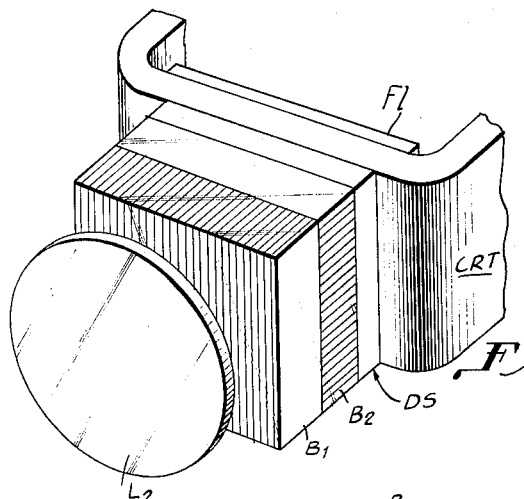
Figure 6:
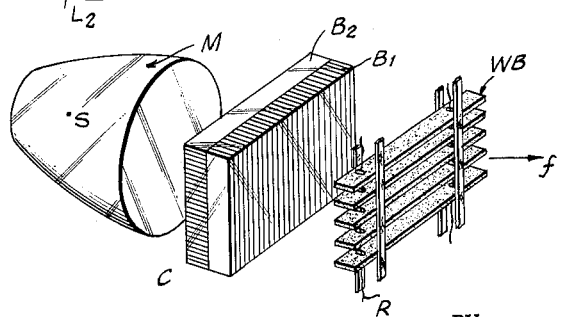

The invention will be better understood with reference to the drawing in which:

FIGURE 1 illustrates, as explained above, the general method for correcting the detrimental effects of optical parallax, FIGURE 2 shows a known optical arrangement using a multilenticular objective for aligning, along one line of a photographic moving film $f$, the images of various data successively displayed at different points of a "decoding screen DS" illuminated by the fluorescent screen Fl of a cathode ray tube CRT, said objective including two achromatic lenses $L_1$, $L_2$, FIGURE 2a shows how the optical arrangement of FIGURE 2 could be simplified, one lens only being required instead of two on FIGURE 2, if use is made of a rigid fiber optics perpendicular to decoding screen DS, the electroluminescent panel LAF being used for data displaying, FIGURE 3 illustrates the application of the invention to a data-processing receiver of the type shown on FIGURE 2a, $B_1$, $B_2$ being the optical collimator, FIGURES 4 and 4a illustrate the application of the invention to color television receivers having a trichrome color filter Fp associated with the optical collimator $B_1$, $B_2$, FIGURE 5 shows a modification of FIGURE 4, in which the optical collimator acts not only as light-guide, but also as color filter; at the right of FIGURE 5, and on FIGURE 5a, is represented the shape to be given to the front edges of the thin sheets constituting said optical collimator, FIGURE 6 shows the application of the invention to a projector of light for optical telegraphy.

On FIGURE 2, CRT is a cathode ray tube, K its cathode, W its Wehnelt cylinder Fl its fluorescent screen, H and V the plates for horizontally and vertically deflecting its electron beam; in front of fluorescent screen Fl is located the decoding screen DS bearing (transparent on a black background) the various symbols (letters, ciphers or other signs) characterizing the various data electrically received from a distant transmitting station under the form of "electrical information signals."

An electronic arrangement, not shown on FIGURE 2, derives, from these received information signals, for each data, appropriate electrical voltages acting on plates H and V, and on cylinder W, for illuminating, on decoding screen DS, the particular symbol corresponding to said data. Whatever is the geometric position of this symbol on screen DS, the corresponding elemental lens $(l_1 \ldots l_n)$ located in front of it, together with achromat $L_1$, throws to "infinite distance" the luminous image of said symbol, whereas achromat $L_2$ brings this luminous image back, at a fixed point (focus of $L_2$) on a photosensitive surface $f$ (which may be a moving photographic film, or a moving special paper for electrostatic printing, or a rotating cylinder having a photoconductive layer for xerographic printing); as this photosensitive surface $f$ moves in the direction of arrow $\varphi$, the symbols corresponding to the successively received data, are recorded side by side along a line of surface $f$.

The application of the present invention to a data-receiving cathode-ray tube (like CRT of FIGURE 2) consists in replacing the assembly of elemental lenses $l_1 \ldots l_n$ and the first achromat $L_1$ by an "optical parallax corrector," so that only one costly achromat $L_2$ is required, as shown on FIGURE 2a. In this FIGURE 2a, the photosensitive surface, on which are aligned the luminous images of the received data, is a light-amplifying-panel LAP made of a lower transparent glass $p_1$ scanned by the light beam emerging from achromat $L_2$, reflected by mirror drum RD driven (for its rotation) by electric motor M synchronized with the horizontal scanning of the fluorescent screen Fl of cathode ray tube CRT, the focus of achromat $L_2$ being located upon said lower glass plate after reflection on said mirror drum RD; between said lower glass plate $p_1$ and the upper glass plate $p_2$ are a photoconductive layer pc and an electroluminescent layer el energized in series by a source of alternating current (not shown on FIGURE 2a) producing a voltage of same hundreds of volts at a frequency of some hundreds of cycles per second; bright luminous images of the symbols corresponding to the electrically received data appear, side by side, at upper glass plate $p_2$ and remain as long as this alternating voltage is applied to layers pc and el.

On FIGURE 2, the optical parallax corrector, located between decoding screen DS and achromat $L_2$, is assumed to be made by a bundle B of fibers of transparent material, all well aligned and perpendicular to the plane of screen DS, and having each a diameter appropriate to the desired dissection of the luminous image formed by the fluorescent light of Fl on said screen DS; but the construction of this bundle of fibers B is necessarily difficult and costly, as soon as the diameter of screen DS is of the order of some ten centimeters. Glass fibers of the rather small desired cross section are breakable; care should be taken for binding them together in perfect order, for example by means of a polyester resin.

The appended FIGURE 3 represents an embodiment of the invention for this application to data-receivers; in this case, the optical parallax corrector between decoding screen DS and achromat $L_2$ is made of two blocks $B_1$, $B_2$ of thin transparent plates acting as "light-guides" and superimposed one on the other in such a manner that, at the intersection of 2 orthogonal plates (belonging one to block $B_1$ and the other to block $B_2$) the same optical effect is obtained as it would occur in case of a single fiber perpendicular to screen DS and having a cross section of a surface appropriate to the dissection desired for the image produced on DS by the fluorescent light of screen Fl of tube CRT (a part of which is shown as a perspective in FIGURE 3).

The transparent material used for the plates of blocks $B_1$ and $B_2$ can be either glass, or polystyrene made by extrusion in very thin sheets, drawn mechanically in their length and their width in order to be rigid in spite of their thinness (biaxially-oriented polystyrene sheets), or methyl-methacrylate, also extruded in thin sheets, or butyral of polyvinyl, or ethylene-polyterephthalate (polyester), or some polycarbonate, or any other substance having a rather high refraction index and a very good light-transmission ability. At least for blocks $B_2$ (FIGURE 3) which is close to the wall of tube CRT bearing the fluorescent screen Fl bombarded by electrons, the material used should either by itself be resistant to ultra-violet-radiation, or should contain some proportion of an appropriate inhibitor, in order to resist to any detrimental effect of ultra-violet-radiation, such as loss of light-transmission-efficiency, or color change (for example yellowing).

Between two consecutive thin sheets of plastic material inside the block $B_2$ (which is close to the wall of the cathode ray tube), a thin layer of light-absorbing-material must be inserted for the reason given hereabove with reference to FIGURE 1; this layer should be a solidified mixture of an appropriate adhesive with small particles for absorbing the light, such as carbon black. Between two consecutive thin sheets of plastic material inside the other block $B_1$ (superimposed upon block $B_2$), a thin layer of light-reflecting-material must be inserted; this layer should be either a solidified mixture of substances having a refraction-index substantially lower than the one of the plastic material of the sheets and also containing a suspension of reflecting particles, such as a metallic powder, or should be a thin metal-leaf (aluminum, for example) stuck to the sheet of plastic material by means of an appropriate adhesive, or should be a thin coating of metal previously evaporated (in vacuum) upon the plastic material.

Various adhesives can be used, according the kind of plastic material used for the sheets of block $B_2$ and of block $B_1$, for example: a solution of polymethacrylate and methacrylate of methyl with some stabilized peroxide acting as polymerization-accelerator, or a solution of polyvinyl-butyral, or a solution of isobutyl-methacrylate in an appropriate cetonic liquid, or a solution of butyl-acetate, or a solution of polymers of diethylene-glycol and terephthalic acid into dioxane (or into a chlorinated solvent).

Many different processes can be used for manufacturing the two stratified blocks ($B_1$, $B_2$) of the optical collimator in accordance with the invention. For applying this invention to television-receivers, for example, large thin sheets of plastic material can be extruded (having a thickness of the order of 0.2 millimeter and having the width of the corresponding side of the wall of the viewing cathode ray tube); after having been coated as explained above (light-absorbing coating, or light-reflecting-coating) these sheets are stuck upon each other for constituting large blocks; later, pieces of these large blocks (having a thickness of the order of 1 centimeter and having the curvature of the upper-wall of said viewing-tube) are superimposed one over the other, and a small transparent layer of a substance (having the same refraction index as said plastic material) being inserted in order to avoid any detrimental reflection or refraction of light between blocks ($B_1$ and $B_2$, on the appended figures).

Another possibility is to extrude large thin sheets of plastic material (thickness of 0.2 millimeter, for example), then, to coat one (or both) of their faces with the proper light-absorber or light-reflector. Then a cutting-machine produces thin "arc-shaped pieces" having the width of one centimeter (for example) and having the same length and curvature as the cathode ray tube; these arc-shaped pieces are then dipped into the appropriate adhesive—later, are kept for some time in a dry room for getting rid of any superfluous solvent, then, put on top of each other under a small pressure in order to give good contact, and so remain at an appropriate temperature until the adhesive solidifies; the stratified blocks so obtained are possibly further reheated for suppressing any strain produced during said solidification, and are finally put one over the other, with (between them) a thin layer of a transparent substance having the same refraction-index as the plastic material used.

The "arc-shaped pieces" of thin sheets of plastic material described above (thickness of 0.2 millimeter, shape of an arc comprised between two circles of the same length and curvature as the upper-wall of the cathode ray tube, the distance between said circles being of the order of 1 centimeter) can also be obtained directly by molding the plastic material under pressure inside an appropriate mold; later, these arc-shaped pieces of plastic material are coated, and juxtaposed as explained above for obtaining the stratified blocks $B_1$, $B_2$ of the optical collimator in accordance with the invention.

FIGURE 4 illustrates the application of the invention to a color television receiver comprising: a cathode ray tube CRT with a uniform fluorescent screen Fl producing white light when scanned by electron pencil F, an optical parallax corrector CP made of blocks $B_1$, $B_2$ acting as light-guides, and a photographic film Fp having, at left, a narrow transparent line $s$ in the middle of a small opaque part $En$, and, at right, a trichrome screen $Elt$ made of successive triplets of 3 thin transparent lines respectively blue ($b$), green ($v$) and red ($r$), said colored lines being in perfect optical registration with the corresponding transparent sheets of block $B_1$ of corrector CP. The fluorescent white light emitted by fluorescent screen $Fl$, guided by the sheets of blocks $B_2$ and $B_1$, is "filtered" by the blue, green or red lines of the trichrome screen $Elt$ for reproducing the received color television picture.

This arrangement provides an important saving of money as compared with the ordinary color television receivers with a cathode ray tube having a mosaic of small elements of materials producing respectively blue, green, or red fluorescent light when struck by the electron pencil; such a viewing tube is obviously more expensive than a tube for black and white television having a uniform fluorescent screen; in a television receiver, the viewing tube is the only item having a relatively short life, and it is important to reduce its price.

Line $s$ on FIGURE 4 marks the beginning of a scanning line of screen $Fl$; at the point of $Fl$ corresponding to $s$ is produced a luminous ray acting upon photoelectric cell $ph$ through cylindrical lens $l$; the short electrical pulse (I) then produced at the output of $ph$ can be compared to the front of the line-synchronizing-pulse received from the distant television-transmitter; therefore this pulse I "times" periodically the scanning of the trichrome screen $Elt$ and permits an appropriate framing of the received color television pictures.

In part $Elt$ of photographic film $Fp$ (FIGURE 4) acting as "trichrome screen," the blue, green and red stripes are vertical, the scanning of the associated fluorescent screen $Fl$ being done by an electron pencil moving linearly and horizontally. FIGURE 4a shows a photographic film, the part $Elt$ of which, acting as trichrome screen, has horizontal blue, green and red stripes ($b$, $v$, $r$), the scanning of the associated fluorescent screen being then done by a "wobbling electron pencil" striking successively a blue strip, then the adjacent green stripe, then the adjacent red stripe, and again the same green stripe, as shown by a period of dotted sinusoidal line on FIGURE 4a; in this case, for the timing of the scanning motion of said electron pencil, the transparent line $s$ of part $En$ of the photographic film has a graded transparency, point $sb$ corresponding to a blue stripe being white, whereas point $sv$ corresponding to a green stripe is "light gray," and point $sr$ corresponding to a red stripe being "dark gray"; a photoelectric cell (such as $ph$ of FIGURE 4) produces then an electric pulse I of an intensity varying against time, and "timing" the vertical position of the cathode ray spot on the associated fluorescent screen (producing always a white fluorescent light) illuminating the photographic film shown on FIGURE 4a, which acts as color filter as well as television viewing screen.

FIGURE 5, on the left shows a modfication of FIGURE 4 in which block $B_1$ of the optical parallax corrector CP in accordance with the invention acts also as color filter so that the above mentioned photographic film $Fp$ is no more required. In this case, the transparent thin plates of block $B_2$, located against the wall of cathode ray tube CRT bearing a uniform screen $Fl$ producing a white fluorescent light when electron pencil F strikes it, are made of a material resistant to ultraviolet-radiation and having a great light-transmission-efficiency in the whole visible spectrum; the thin sheets constituting block $B_1$ (orthogonal to those of block $B_2$) are made of colored materials, with great-light-transmission - efficiency—in part $Elt$, acting both as optical-parallax-corrector and also as trichrome television viewing screen; in this block $B_1$, the successive sheets are blue ($b$), green ($v$), red ($r$), periodically, and they act as light-guide as well as color filter; at the left of this part $Elt$ are shown, as in FIGURE 4 and 4a, another part $En$ for "timing" the scanning motion of electron pencil F; this part of block $B_1$ is made of two opaque plates separated by a white thin sheet. In case of an "horizontal-colored stripes viewing device," similar to the case illustrated by FIGURE 4a, part $En$ would be made of two vertical opaque sheets separated by a vertical white sheet, the end $s$ of which would be covered by a thin film having a line of graded transparency (with points corresponding to $sb$, $sv$, $sr$ on FIGURE 4a); block $B_1$ of the optical parallax corrector would be made of horizontal sheets (FIGURE 5a) successively blue, green and red, and block $B_2$ made of vertical sheets of no color; a photoelectric cell, located in front of line $s$, would produce the electric pulse I of varying intensity for "timing" the scanning motion of the electron pencil of the cathode ray tube on which said parallax corrector is placed.

In case of a color television receiver using the second embodiment of the invention as shown on FIGURE 5, in order to give to a few persons seated in front of the trichrome color filter $Elt$ the possibility of seeing well the received color television pictures in spite of the light-guiding-effect (only perpendicularly to the wall of cathode ray tube CRT), it is advisable to coat the front side of block $B_1$ of potical parallax corrector CP by a material diffusing the light preferably on horizontal planes; this could be in the form of a very thin "goffered film" equivalent to an assembly of very small elliptical divergent lenses corresponding to the various points of the television picture, said lenses diffusing light more in the horizontal plane than in the vertical plane.

Another possibility is to give an appropriate shape to the front edge of each sheet of block $B_1$ of parallax corrector CP of FIGURE 5; at the right of said figure is an enlarged perspective view of 3 adjacent sheets respectively blue ($b$), green ($v$) and red ($r$), the curvature of said edge acting as a lens diffusing in the horizontal plane. If the colored sheets of block $B_1$ are horizontal, instead of vertical, their front edge should be cut, as shown on FIGURE 5a, in the form of a fullwave rectified sine-wave.

FIGURE 6 illustrates the application of the invention to an optical telegraph transmitter; S is a powerful source of light located at the focus of a parabolic mirror M; C is the collimator in accordance with the invention, made of 2 blocks ($B_1$, $B_2$) of orthogonal thin transparent sheets acting as light guides; WB is a "Venetian window-blind" made of opaque plates connected to an articulate parallelogram, a side R of which is a rod moved up and down (in accordance with the chosen secret telegraph code, and either automatically or manually) for making said plates horizontal and parallel to each other (blind open), or vertical and joining together (blind closed); when the blind is open, the light emitted by S is perfectly collimated by C in the direction of arrow $f$, and therefore, the optical telegraph signals can be detected only by a distant receiver in this direction; a telegraph transmission is so obtained with a better privacy than in case of radioelectricity, for which aerials radiating only in a very narrow beam are difficult to achieve, or are too cumbersome.

While the invention has been illustrated and described as hereinabove, it is not intended to be limited to the details shown, since various modifications and structural changes may be made without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of generic or specific aspects of this invention, and, therefore such adaptations should and are intended to be comprehended within the meaning and range of equivalence of the following claims.

What is claimed as new and desired to be secured by Letters Patent is:

1. Optical collimator for guiding light in an accurate predetermined direction made of two stratified blocks of thin sheets of transparent material coated with appropriate adhesive, said two blocks being superimposed on each other so that their respective thin sheets are orthogonal, and some substance having the same refraction index as said transparent material being laid between said two blocks in order to avoid any undesired reflection or refraction of the light which propagates in said predetermined direction.

2. Optical collimator in accordance with claim 1 located between a powerful projector of light and a window-blind controlled in accordance with a chosen secret telegraph code, whereby optical telegraph signals are transmitted with good privacy towards a distant telegraph receiver located in said predetermined direction.

3. Collimator in accordance with claim 1 acting as optical parallax corrector located against the wall of a cathode ray tube bearing the fluorescent screen, for improving the definition and the contrast of the luminous images produced by said tube, comprising in combination: a first block of thin sheets of transparent material resistant to ultraviolet radiation and having a great light transmission efficiency, said first block being located against the wall of said tube and a thin layer of light-absorbing material being inserted between consecutive sheets of said first block, a second block of thin sheets of transparent material with great light-transmission efficiency, a thin layer of light-reflecting material being inserted between consecutive sheets of said second block, said second block being superimposed upon said first block so that the thin sheets of one are orthogonal to those of the other, and a thin layer of same refraction index as the transparent material of said thin sheets being inserted between said first and second blocks, whereby said two blocks cooperate for producing the same light-guiding effect as a bundle of very thin fibers of very small cross section, but at a much smaller cost.

4. Collimator in accordance with claim 3 in which each thin sheet of said first block is previously coated with a liquid containing a suspension of carbon black, said liquid acting as adhesive which solidifies for sticking one thin sheet to the next one.

5. Collimator in accordance with claim 3 in which two consecutive thin transparent sheets of said second block are separated by a very thin leaf of metal previously dipped into an appropriate adhesive.

6. Collimator in accordance with claim 3 in which each thin transparent sheet of said second block is previously metallized in vacuum, and further coated with an appropriate adhesive.

7. Optical parallax corrector in accordance with claim 3 located, inside an electrical data-receiver with cathode ray tube, between the decoding screen bearing symbols corresponding to the various data and successively illuminated by the fluorescent screen of said tube on one side, and, on the other side, an achromat having its focus on a photosensitive surface on which the luminous images of the symbols of the data electrically received are successively recorded.

8. Optical parallax corrector in accordance with claim 3 and located between a cathode ray tube for black and white television and a photographic film bearing juxtaposed elemental areas of the three primary colors specified for color television, in which all the sheets of said corrector act as light-guides with a uniformly great light-transmission efficiency in the whole visible spectrum, and in which the sheets located against the wall of said tube bearing the fluorescent screen are made of a material resistant to ultraviolet-radiation, whereby a color television receiver can be operated with the cheap cathode ray tubes for monochrome television.

9. Optical parallax corrector in accordance with claim 3 in which the sheets of said first block, located against the wall of said cathode ray tube bearing a uniform screen producing white fluorescent light, have a uniformly great light-transmission efficiency in the whole visible spectrum and also resistant to ultraviolet-radiation, whereas the sheets of said second block have successively the three primary colors specified for color television whereby said second block acts both as light-guide and as trichrome color filter for the reproduction of color television pictures.

10. Optical parallax corrector in accordance with claim 9 in which a thin coating of light-diffusing material acting as a goffered film is placed upon the front of said second block made of colored thin sheets, said film being equivalent to an assembly of elemental elliptical divergent lenses diffusing the colored lights more horizontally than vertically.

11. Optical parallax corrector in accordance with claim 9 in which the outer edges of the colored thin sheets of said second block have an appropriate shape for diffusing horizontally the corresponding color lights.

References Cited by the Examiner

UNITED STATES PATENTS 3,145,247   8/1964   Meltzer _____ 88—1

DAVID G. REDINBAUGH, *Primary Examiner.*

J. H. SCOTT, *Assistant Examiner.*